United States Patent [19]

Benjamin

[11] 4,213,481
[45] Jul. 22, 1980

[54] VALVE CONTROL MECHANISM

[75] Inventor: Benjamin C. Benjamin, Flint, Mich.

[73] Assignee: Schmelzer Corporation, Durand, Mich.

[21] Appl. No.: 24,968

[22] Filed: Mar. 29, 1979

Related U.S. Application Data

[63] Continuation of Ser. No. 829,225, Aug. 31, 1977, abandoned.

[51] Int. Cl.² ............................................. F16K 11/04
[52] U.S. Cl. .......................... 137/596.18; 137/625.66; 137/DIG. 8
[58] Field of Search .................... 137/DIG. 8, 596.18, 137/625.5, 625.66, 869

[56] References Cited

U.S. PATENT DOCUMENTS

| | | | |
|---|---|---|---|
| 3,389,720 | 6/1968 | Brandenberg | 137/625.66 |
| 3,542,289 | 11/1970 | Ojala et al. | 137/625.66 X |
| 3,972,472 | 8/1976 | Kawabata | 137/595 X |

Primary Examiner—Gerald A. Michalsky
Attorney, Agent, or Firm—Fisher, Gerhardt, Crampton & Groh

[57] ABSTRACT

A valve control mechanism for turbo-charged internal combustion engines having a plurality of valves controlling fluid flow paths to devices regulating engine operation and so arranged that when the pressure in the air fuel induction system increases from a vacuum to a positive pressure the control paths are closed to interrupt operation of the control devices.

4 Claims, 4 Drawing Figures

VALVE CONTROL MECHANISM

This is a continuation of application Ser. No. 829,225, filed Aug. 31, 1977, now abandoned.

This invention relates to pressure responsive valves and more particularly to a pressure responsive valve suitable for simultaneously controlling several fluid flow paths.

Various functions of internal combustion engines are controlled by devices relying on vacuum pressure established at the base of the carburetor adjacent the manifold of the engine. In conventional engines, such pressure varies from a negative or a vacuum pressure to zero pressure and has a relationship to the loading of the engine. However, with turbo-charged engines, manifold pressure varies from a negative to a positive or atmospheric pressure and the vacuum signals originating from the carburetor do not accurately reflect engine load. For proper engine operations, certain functions of the engine should be terminated when under loading conditions which in conventional engines would result in low vacuum pressure. Examples of such functions are vacuum advance at the distributor, exhaust gas recirculation control and air cleaner temperature control.

It would be highly desirable and it is an object of this invention to have a control valve responsive to a predetermined manifold pressure to terminate fluid pressure to certain engine controls.

Also, it is an object of the invention to provide a valve control device which is operative to simultaneously terminate a plurality of functions.

A control mechanism for turbo-charged internal combustion engines is provided wherein a plurality of valves each control a separate flow path which utilizes intake manifold pressure to operate control devices of the engine. The valves are operated simultaneously to maintain the flow paths open when the pressure in the air-fuel induction system is below atmospheric pressure, that is a vacuum, and move simultaneously to close off all of the flow paths when the pressure in the induction system becomes positive, that is atmospheric pressure or above. The valves are operated through a diaphragm assembly which responds to the pressure in the air induction system to move all of the valves simultaneously between their open and closed positions.

These and other objects of the invention will be apparent from the following disclosure and from the drawings in which.

Figure 1:
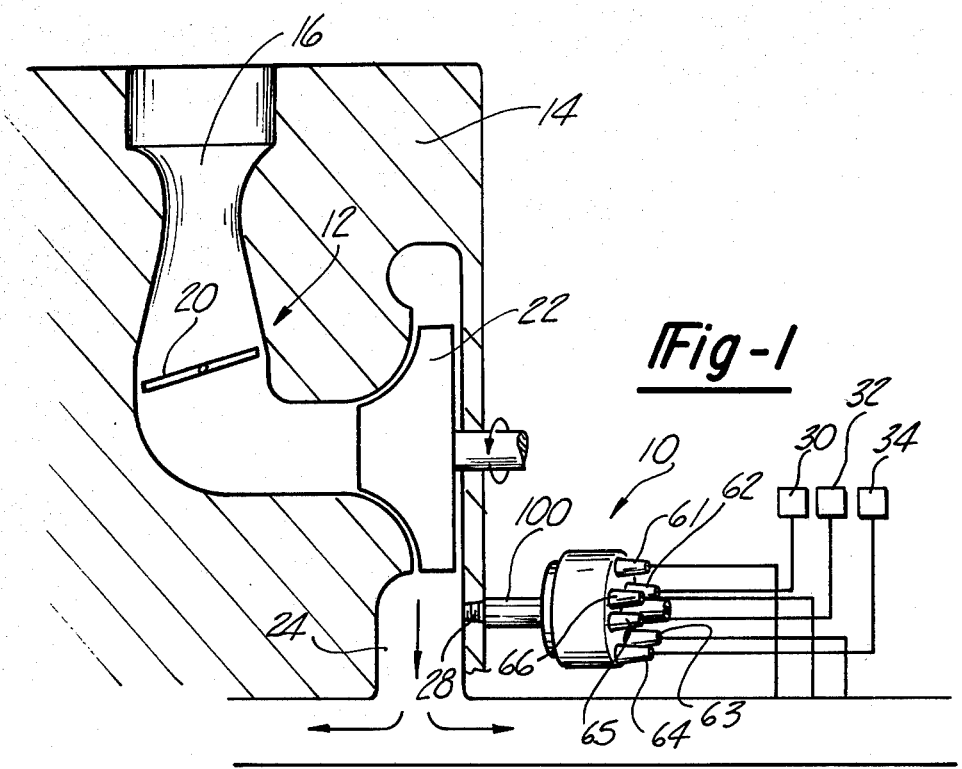
FIG. 1 is a schematic view of an air-fuel induction system and control devices used with a turbo-charged engine under the control of the valve mechanism embodying the invention.

The present invention is embodied in a valve 10 for use with an induction system indicated at 12 for a turbo-charged engine. The induction system 12 includes a carburetor 14 having an induction passage 16 under the control of a throttle valve 20. Disposed in the induction passage is a turbo-charger compressor 22 which receives the air charge from the induction passage 16 and delivers it to the intake manifold 24 of the engine.

The control valve 10 of the present invention is connected to an outlet 28 associated with the intake manifold and is employed for the purpose of controlling various vacuum operated functions indicated at 30, 32 and 34 and connected through the valve 10 to the intake manifold 24.

The control valve 10 includes a housing 40 having a pair of housing members 42 and 44 made of plastic material or the like and forming a plurality of valve chambers or cavities 46. The housing members 42 and 44 are held in abutting relationship with each other by a metal shell member 48. The valve housing is small in size and in actual practice has a diameter of less that two inches. The shell member 48 and housing member 44 form a housing cavity which is divided into an operating chamber 50 and an exhaust chamber 52 by a diaphragm assembly 54. The diaphragm assembly 54 has a diaphragm 56 with the outer peripheral edge 58 clamped to the housing member 44.

The housing member 42 is provided with a plurality of annularly spaced ports 61, 62, 63, 64, 65 and 66 and a center port 67 all communicating with the interior of the housing 40. Each of the ports is in the form of a tapered stem to receive a hose or conduit for conveying air. Adjoining pairs of ports communicate with each other. For example, port 61 communicates with port 62, port 63 communicates with port 64 and port 65 communicates with port 66. Each pair of ports has a passageway 69 formed in the housing member 44 by which the ports of each pair communicate with each other.

One valve cavity 46 is associated with each pair of control ports and contains a valve assembly 74. Each valve assembly includes a valve closure element or disc 76 one side of which is adapted to seat on an O-ring 78 and the other side of which is adapted to seat on an O-ring 80. One O-ring 80 surrounds each of the inlet ports 61, 63, and 65. Each of the O-rings 78 is seated in a cavity 46 around a valve stem 82 formed integrally with each of the discs 76. The valve stem 82 is slidably supported in an opening 84 formed in the housing member 44. The wall of opening 84 is formed with a groove 86 by which the valve cavities 46 communicate with the exhaust chamber 52 at one side of the diaphragm assembly 54.

Figure 3:
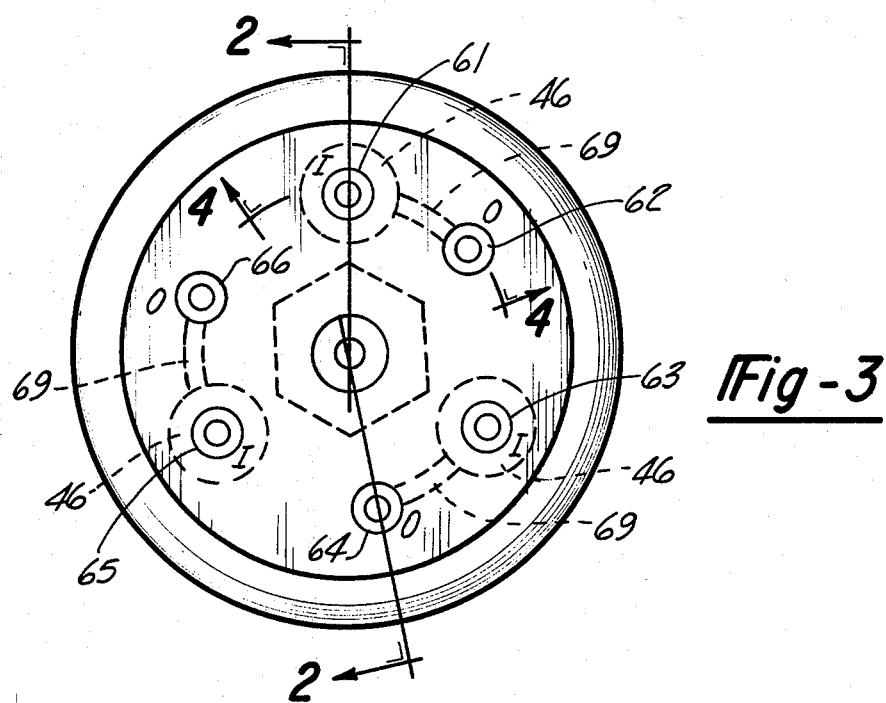
FIG. 3 is an end view of the control mechanism seen in FIG. 2.
Figure 2:
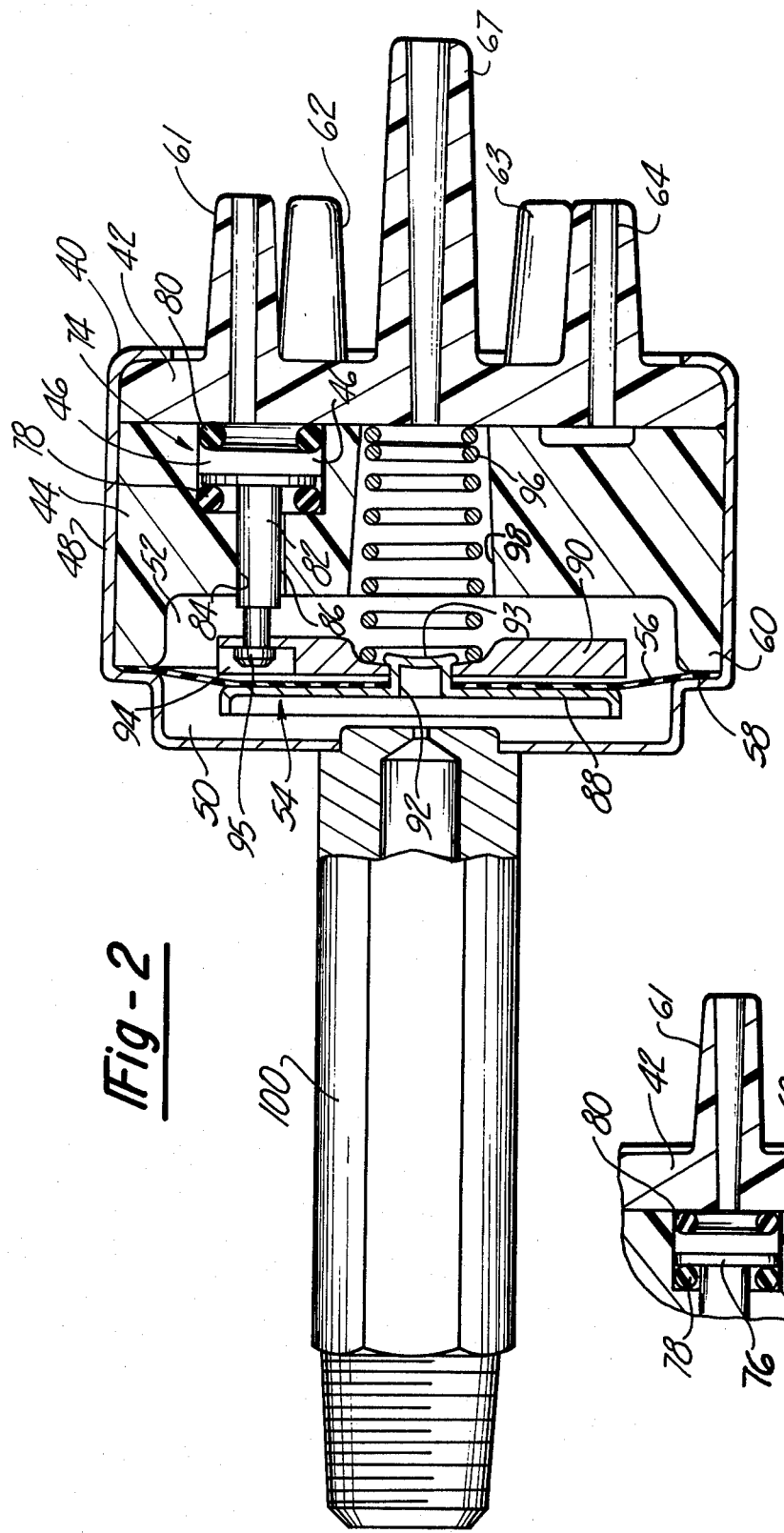
FIG. 2 is a cross sectional elevation of the control mechanism seen in FIG. 1 but at an enlarged scale.
Figure 4:
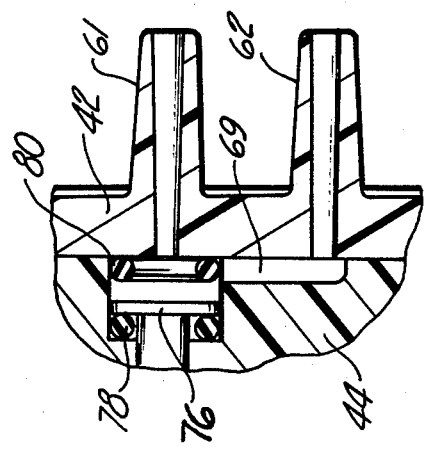
FIG. 4 is a cross sectional view of a portion of the control mechanism seen in FIG. 3 and taken on line 4—4.

The ends of the valve stems 82 opposite to the valve discs 76 are attached to the diaphragm assembly 54 which includes a backing plate 88 and a backing plate 90 held together at opposite surfaces of the diaphragm 56 by means of a central stem 92 formed integrally with the backing plate 88 and passing through an opening in the backing plate 90 and upset as indicated at 93 to rivet the backing plates 88 and 90 together. The backing plate 90 is provided with a plurality of cavities 94 which receive the heads 95 on each of the valve stems 82 so that movement of the diaphragm assembly 54 results in movement of the stems 82. The diaphragm assembly 54 is biased to the left as viewed in the drawings by a spring 96 which is disposed axially of the housing 40 in a bore 98 so that the parts normally occupy the positions seen in FIG. 3 with all of the valve discs 76 in contact with the O-rings 78. The bore 98 maintains the associated exhaust chamber 52 in communication with the port 67 and therefore the atmosphere.

The shell 48 of the housing 40 supports an elongated intake member 100 communicating with the operating chamber 50 at the interior of the housing 40 and is adapted to be connected to the intake manifold 24 of the induction system 12.

In the normal condition of the valve 10, the spring 96 biases the diaphragm assembly 54 to the left so that the valve discs 76 are all seated on the O-rings 78. Under such conditions the inlet ports 61, 63, and 65 of each pair of ports communicates with the outlet ports 62, 64 and 66 respectively. Similarly, when the control chamber 50 is subjected to vacuum pressure, the exhaust chamber 52 at the opposite side of the diaphragm 56 will be subjected to atmospheric pressure by way of the center port 67 and bore 98. This results in a differential pressure urging the diaphragm assembly 54 to the left. Such movement pulls on the valve stems 82 to pull the valve discs 76 to the left into sealing engagement with the O-rings 78. This closes off communication between the valve cavities 46 and the exhaust port 67 but maintians the pairs of inlet and outlet ports in communication with each other and permits air flow in the fluid flow lines or paths between the manifold and devices 30, 32 and 34.

Under certain conditions of engine loading, the pressure in the intake manifold will increase above the typical vacuum pressure. By way of example, such pressure may be in the range of one to two psi. When the pressure reaches such levels in the control chamber 50 a differential is created on the diaphragm 56 which acts to the right as viewed in the drawings. The pressure differential causes movement of diaphragm assembly 54 to compress the spring 96 and to simultaneously move all of the valve stems 82 and the attached discs 76 to the right out of engagement with the seats formed by the O-rings 78.

When the valve discs 76 move out of engagement with the O-rings 78 and into engagement with the O-rings 80, the inlet ports 61, 63 and 65 from the vacuum source, namely the intake manifold 24, are closed so that they are isolated from the outlet ports 62, 64 and 66. Simultaneously, the outlet ports 62, 64 and 66 are opened to the center exhaust port 67 by way of the passageways 69, valve cavities 46, groove 86 and exhaust chamber 52. Such communication assures that any residual pressure, that is, vacuum pressure existing in the controlled devices 30, 32 and 34 is dissipated to bring the pressure to atmospheric pressure thereby terminating further operation of the devices 30, 32 and 34.

When the manifold pressure returns to a vacuum level, the differential pressure acting on the diaphragm 56 and the biasing effort of the spring 96 moves the diaphragm assembly 54 and valve discs 76 to the left as viewed in the drawings so that the valve discs 76 are reseated on the O-rings 78. Under those conditions the exhaust passageways are closed to the valve cavities 46 and the pairs of inlet and outlet ports are placed in communication with each other so that control functions at the control devices 30, 32 and 34 can resume.

Although the valve control mechanism has been disclosed with three fluid flow paths, it will be understood that a lesser or greater number of such paths could be used.

A valve control mechanism for a turbo-charged internal combustion engine has been provided for regulating a plurality of control devices used to regulate the engine and which are responsive to the pressure in the air-fuel induction system of the engine. A control mechanism is responsive to the pressure in the air-fuel induction system to move a plurality of valves simultaneously between an open position in which the various control devices are free to respond to the pressure in the induction system to a closed position when the pressure in the induction system becomes positive or atmospheric so that operation of the control devices is prevented. The control mechanism employs a diaphragm assembly which moves all control valves simultaneously between their open and closed positions to regulate separate fluid flow paths.

I claim:

1. A control mechanism for turbo charged internal combustion engines having a control device responsive to intake manifold vacuum pressure, the combination comprising; a housing including a first member forming a valve cavity, said housing including a second member forming inlet, outlet and exhaust ports, said inlet port communicating with a variable source of vacuum, said outlet port communicating with said control device and said exhaust port communicating with the exterior of said housing, valve means including a valve element disposed in said valve cavity and being movable between a normal open position in which said inlet and outlet ports communicate with each other to an operative position in which said inlet port is closed and said outlet port communicates through passage means in said second member with said exhaust port and said control device, a movable wall a third member holding said movable wall relative to said second member and forming a control chamber at one side of said movable wall, the other side of said movable wall being connected to said valve element, a control port connected to said control chamber and being connected to said engine manifold, spring means biasing said movable wall to a first position to maintain said valve element in said normal open position in the presence of a pressure in said control chamber no greater than atmospheric pressure, said movable wall being movable to a second position in the presence of a positive pressure greater than atmospheric pressure to move said valve element to said operative position to isolate said control device.

2. The combination of claim 1 wherein additional inlet ports and outlet ports communicate with said housing and wherein additional valve elements are disposed in said housing for the control of said additional ports in the same manner as said first mentioned ports, said movable wall being connected to said additional valve elements for simultaneous movement of all of said valve elements between a normal and operative positions.

3. A combination of claim 1 in which said inlet and outlet ports extend generally parallel to each other from one end of said housing.

4. The combination of claim 1 wherein said third member engages said first member to hold all of said members together to form said housing.

* * * * *